April 25, 1967 M. A. DURAKIS ETAL 3,316,134
METHOD AND APPARATUS FOR PRODUCING MULTICONDUCTOR RIBBON CABLE
Filed Dec. 27, 1963
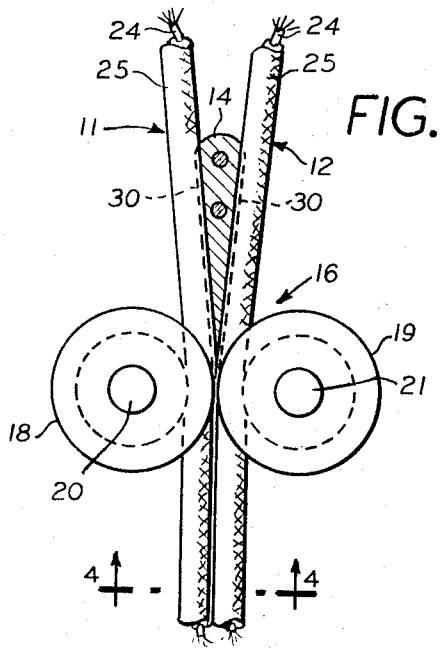
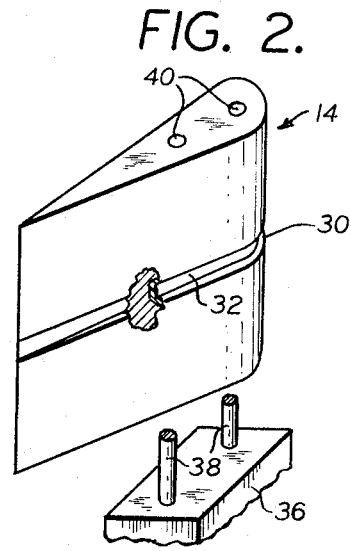
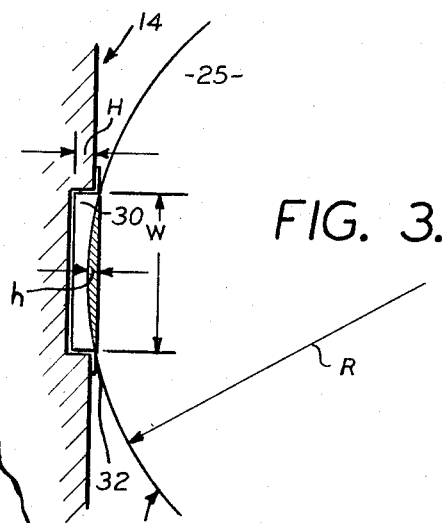
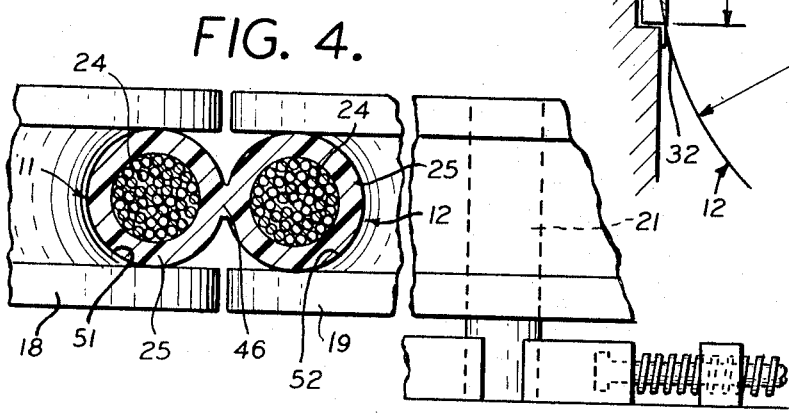
INVENTORS
Manuel A. Durakis
BY William J. Lucas
Emery, Whittemore, Tudor & Graham
ATTORNEYS.

United States Patent Office 3,316,134
Patented Apr. 25, 1967

3,316,134
METHOD AND APPARATUS FOR PRODUCING
MULTICONDUCTOR RIBBON CABLE
Manuel A. Durakis, Brooklyn, N.Y., and William J. Lucas, Morgan, N.J., assignors to General Cable Corporation, New York, N.Y., a corporation of New Jersey
Filed Dec. 27, 1963, Ser. No. 333,908
9 Claims. (Cl. 156—47)

This invention relates to electrical conductors and more particularly to ribbon cable which has two or more thermoplastic insulated wires or cables formed into a ribbon cable by joining the two or more wires or cables in a parallel plane and in such a way that the thermoplastic insulated wires or cables can subsequently be pulled apart without damaging the insulation.

One way in which ribbon cables are made is by bringing the insulated wires or cables together in a side by side relationship, locally heating narrow strips by means of a wedge type heating blade along adjacent sides of the insulation to a fusion or welding temperature of the thermoplastic material and pressing the wires together so as to bond the insulations together along the area of the narrow strips of the confronting faces which were heated by the heating element.

It is an object of this invention to provide an improved method and apparatus for making ribbon cable with a heating element for producing welding temperatures of the thermoplastic insulation.

Another object of the invention is to form ridges on the outside confronting faces of the wires or cables and to join the wires or cables by welding together the ridges so as to leave a web between the wires or cables. This web is made of moderate cross section and is not made of proportionately greater strength for wires or cables of greater diameter. The web can be torn to pull the wires or cables apart by manual effort and without damaging the insulation.

Another object of the invention is to prevent softened thermoplastic material from sticking to the heating element, decomposing, and subsequently coming off on the surface of the insulation and producing defective ribbon cable which must be rejected by the inspection department.

The invention will be described in connection with the making of a ribbon cable having two single insulated conductors connected together; but it will be understood that the invention is applicable to ribbon cables of any desired number of wires or cables which are joined in a plane, and that the term "wire" is used herein in a generic sense to designate also a group of wires insulated from one another and enclosed in a common insulation which surrounds the group of wires.

The thermoplastic insulating material is heated to bond the wires together to make the ribbon cable and this heating may be to fusion, or it may be sufficient to merely soften the insulation material and bring it to a condition where it will bond together if subjected to moderate pressure. The expression "welding temperature" is used herein to designate a temperature at which the insulating material will bond to similar insulating material when pressed firmly against it.

Other objects, features and advantages of the invention will appear or be pointed out as the description proceeds.

In the drawing, forming a part hereof, in which like reference characters indicate coresponding parts in all the views:

FIGURE 1 is a diagrammatic top plan view of apparatus for making ribbon cable in accordance with this invention;

FIGURE 2 is an enlarged, perspective view of the heating element shown in FIGURE 1;

FIGURE 3 is a geometric diagram illustrating a correlation of the heater groove with the diameter of the wire for producing ridges that will connect the wires by means of a connecting web; and FIGURE 4 is a greatly enlarged sectional view taken on the line 4—4 of FIGURE 1.

FIGURE 1 shows two wires 11 and 12 which pass on opposite sides of a heating element 14. This heating element 14 is preferably a wedge shaped blade with the small end of the wedge immediately adjacent to a roll pass 16 consisting of two rolls 18 and 19 rotatable on vertical axles 20 and 21.

Each of the wires 11 and 12 includes a conductor 24 surrounded by thermoplastic insulation 25. As previously explained, the thermoplastic insulation 25 may be around a group of separately insulated conductors.

The insulation 25 may be of various thermoplastic materials. The examples which are given by way of illustration are polyethylene or polyvinyl chloride compounds.

The heating element 14 has grooves 30 in its opposite side and each of these grooves 30 is preferably covered with a coating of material having a low coefficient of friction. The low friction coating 32, is shown for one side of the heating element 14 in FIGURE 2. A similar groove 30 and coating 32 is also located on the other side of the heating element. While the invention can be made with only one groove performing a ridge on only one wire, it is preferred to have ridges formed on both of the wires 11 and 12 by passing them through grooves 30 as will be explained.

The purpose of the low friction coating 32 is to prevent the heated insulation from wiping off on the heated element 14. If this occurs, the insulation which wipes off tends to decompose and eventually sticks to some surface of wire that is drawn across the heater at a later date with a resulting impairment of the surface of the wire and with the result that the ribbon wire having the impairment has to be rejected by the inspection department. A highly suitable material for the coating 32 is a tetrafluoroethylene resin such as that sold by E. I. du Pont de Nemours & Co. under its trademark "Teflon."

The heater element 14 is relatively stationary and may be supported from a base 36 with dowel pins 38 extending upwardly from the base 36 and into openings 40 in the heater element 14. This makes the heater element 14 easily replaceable so that any heater element can be removed and another one substituted whenever it becomes desirable to have grooves 30 of different width or different depth for different kinds of wires. Changes in the heater element may also be desirable because of a change from wires covered with one kind of insulation to others which are covered with insulation made of a different thermoplastic material. The heater element 14 is preferably heated by electric resistance and the dowels 38 can be used as the conductors for supplying current to the heater element.

FIGURE 3 shows the insulation of the wire 12 brought against the side of the heater 14 but for purposes of this explanation, the insulation around the wire 12 is not shown distorted to form a ridge on the periphery of the insulation. The width of the groove 30 is indicated by the dimension W. This width is always substantially less than the radius of the wire 12, and with wires of larger radius, the width W is proportionately smaller because if the width W increased in proportion to the size of the wire, the connection between wires of the ribbon cable would be too strong to be torn apart by manual effort. Because of the curvature of the circumference of the wire 12, a segment of the wire insulation will project into the grove 30 even without any distortion of the insulation. This segment has the width W and has a height $h$. It is evident that if the groove 30 were no deeper than the dimension $h$, then the ridge formed by the insulation being pressed into the grove 30 would not actually extend any further from the center of the wire than does the original insulation. The depth of the groove 30 is, therefore, greater than $h$ and is indicated by the reference dimension $H$ which is substantially larger than $h$.

In carrying out the process of this invention, and utilizing the apparatus illustrated in the drawing, the heating element 14 raises the temperature of the insulation 25 to a softening temperature so that the pressure of the wires against the side of the heater element causes the insulation 25 to be distorted and to flow into the confines of the groove 30. The upper and lower walls of the groove 30 limit peripheral flow of the soft insulation 25 and thus limit the width of the ridge formed on the peripheral face of the wire 12. Radial distortion of the soft insulation is limited by the depth of the groove 30 and the height of the ridge is $H$ at both sides of the ridge through the actual height in excess of the original radius of the wire is $H$ minus $h$.

The groove 30 shown in FIGURE 3 has a slight taper toward the outside so as to provide a "mold relief" but it will be understood that this groove 30 is merely illustrative of one shape of groove and that various cross sections can be used including those which have the top and bottom walls converge greatly toward the outside so as to provide a web which is much thinner along its center portion.

FIGURE 4 shows the wires 11 and 12 after they have been brought together in the bite of the rolls 18 and 19. The ridges formed along the confronting faces of the wires 11 and 12 have been brought into contact and welded together to form a web 46. It will be evident that the parts of the insulation of the wires 11 and 12 aside from the ridges which form the web 46 do not touch each other at any place but are completely separated. Thus the wires 11 and 12 can be pulled apart and the web 46 can be torn without damaging the insulation that surrounds the wires 11 and 12. FIGURE 4 shows insulation 25 surrounding a stranded wire or conductor 24; and in place of this stranded conductor 24, there may be a plurality of separately insulated wires forming a cable group, as previously explained.

Portions of the rolls 18 and 19 are shown in FIGURE 4 and these portions include grooves 51 and 52 in the rolls 18 and 19, respectively. The grooves 51 and 52 are circumferential and of a radius to receive the particular cross section of wire which is currently being bonded to make a ribbon cable. The depth of these grooves 51 and 52 from the circumference of their respective rolls is important. If the rolls 18 and 19 are to be run with their peripheries in contact with one another, then the combined depth of the grooves 51 and 52 must be greater than twice the diameter of the wires 11 and 12. Otherwise the wires would be pressed together so as to squeeze the web 46 out from between the wires or to greatly distort the width of the web. On the other hand, the combined depth of the grooves 51 and 52 must be less than twice the diameters of the wires 11 and 12 plus the combined heights of the ridges formed on the peripheral surfaces of the insulation on the wires. Otherwise the top faces of the ridges would not be pressed into contact to bond together. If the grooves 51 and 52 are shallower than indicated, compensation can be made by not having the peripheral surfaces of the rolls 18 and 19 contact with one another; but if the grooves 51 and 52 are too deep, then there is no way in which to compensate and satisfactory results cannot be obtained.

The rolls 18 and 19 may be of different diameter than indicated in FIGURE 1, and the axles 20 and 21 are preferably made adjustable to accommodate different diameters. This is conventional in equipment for supporting rolls of a roll pass. It is another feature of the preferred embodiment of this invention, however, that the heater element 14 extends part way between the rolls 18 and 19, as shown clearly in FIGURE 1 so that the faces of the ridges are in contact with the heater element 14 up to the time that they come into substantial contact with one another. This has advantages in control, but it has also the practical advantage that the confronting faces of the insulation do not need to be so highly heated in order to have them still at a welding temperature when the surfaces touch one another to make the bond.

The preferred embodiment of the invention has been illustrated and described, but changes and modifications can be made, and some features can be used in different combinations without departing from the invention as defined in the claims.

What is claimed is:

1. In the manufacture of ribbon cables by passing thermoplastic insulated wires past a heating blade that brings the confronting faces of the insulation to a welding temperature, and by bringing the heated surfaces of the insulation into contact to weld the insulated wires together in a ribbon cable, the improvement which comprises softening the insulation by localized heat applied to confronting faces and confining the softened insulation of at least one wire along parallel zones spaced from one another by a zone substantially narrower than each of the wires and across which the locally-softened insulation is unconfined and flows radially to form a ridge on the peripheral surface of the insulation of one of the wires at a location confronting the other wire and while the insulation is heated to a welding temperature, then bringing the top of the ridge together with the other wire at welding temperature to form a web that joins the insulated wires in a ribbon cable with all parts of the insulation other than said ridge spaced from one another.

2. The method of making ribbon cables as described in claim 1 characterized by forming ridges on both wires and bringing the tops of the ridges together to make the web.

3. The method of making ribbon cables as described in claim 2 characterized by distorting the thermoplastic insulation from a circular contour locally on the sides of the wires that confront one another to form the ridges, and confining circumferential flow of the distorted insulation in peripheral directions to limit the thickness of the web.

4. The method of making ribbon cables as described in claim 1 characterized by heating the thermoplastic insulation by contact with a relatively stationary surface having a low coefficient of friction at the heating temperature, and limiting the heating of the insulation to a temperature that leaves the insulation with sufficient viscosity to avoid wiping off on the stationary surface.

5. The method of forming a ribbon cable from a plurality of wires having thermoplastic insulation thereon, which method comprises heating the insulation on the confronting faces of the wires to a welding temperature, distorting the heated insulation on the confronting face of at least one of the wires so as to form a ridge on the peripheral surface of the insulated wire, limiting the distortion so that the ridge has a width substantially less than the radius of the insulated wire and a depth substantially greater than the radial height of a segment of a circle having the radius of the insulated wire and a width equal to that of the ridge, and while the confronting faces of the wires are at welding temperature, pressing the top of the ridge of one wire against the heated confronting face of the other wire to weld the ridge to the other wire, and guiding the wires so that they touch only where the top of the ridge confronts a face of said other wire.

6. An apparatus for connecting insulated wires that are covered with thermoplastic insulating material and that are to be joined to form a ribbon cable, which apparatus includes a roll pass in which the wires are brought together and a relatively stationary heating element between the wires immediately ahead of the roll pass and against which the wires are held by the rolls of said roll pass, the improvement which comprises a groove in one side of the heating element and into which a portion of the insulation of one of the wires extends, the groove having top and bottom walls spaced from one another by a distance substantially less than the radius of the insulated wire that extends into the groove, and the groove having a depth substantially greater than the radial height of a segment of a circle having a radius of the insulated wire and a width equal to that of the groove whereby plastic insulation in the groove forms a ridge of insulation on the peripheral surface of the wire, the roll pass having two rolls with concave faces that provide circumferential grooves for receiving the insulated wires and bringing said insulated wires into contact with the heating element and with one another as the wires pass beyond the heating element, the combined depth of the grooves in said rolls being greater than twice the diameter of the insulated wires but less than twice the diameter of the wires plus the height of the ridge so that the top of the ridge is brought into contact with the insulation of the other wire within the roll pass and without any other parts of the insulation of the wires coming into contact with one another.

7. The apparatus described in claim 6 characterized by the heating element being a wedge-shaped blade with the small end of the wedge closest to the roll pass, the heating blade having grooves in its opposite sides so that both wires extend into grooves and ridges are formed on both of the insulated wires, and the grooves of the rolls being correlated with the cross sections of the wires to bring the tops of the ridges of both wires into contact with one another and to form a web having a width made up partly of the radial height of both of the ridges.

8. The apparatus described in claim 7 characterized by the small end of the ridge extending into the space between the rolls so that the heat is applied to the thermoplastic insulation until the tops of the ridges are in substantial contact with one another.

9. Apparatus for forming a ribbon cable from a plurality of wires having themoplastic insulation thereon, including in combination a heater with a groove therein of a width substantially less than the radius of one of the insulated wires and of a depth substantially greater than the radial height of a segment of a circle having the radius of the insulated wire and having a width equal to that of the groove, means pressing the wire against the heater with enough pressure to distort the heated insulation into the groove to form a ridge on the insulation, guide means for another wire and in position to bring the other wire into contact with the top of the ridge of insulation on the first wire immediately adjacent to the heater and while the ridge is at a welding temperature, the guide means being positioned to hold the wires out of contact except at said ridge whereby the wires are spaced and connected only by a web formed by said ridge.

References Cited by the Examiner

UNITED STATES PATENTS

| | | | |
|---|---|---|---|
| 2,204,782 | 6/1940 | Wermine | 156—55 |
| 2,749,261 | 6/1956 | Hardison | 156—47 |
| 3,082,292 | 3/1963 | Gore | 156—55 X |
| 3,234,072 | 2/1966 | Drebben | 156—583 |

EARL M. BERGERT, *Primary Examiner.*

P. R. WYLIE, T. R. SAVOIE, *Assistant Examiners.*